United States Patent [19]

Owen et al.

[11] Patent Number: 5,605,252

[45] Date of Patent: Feb. 25, 1997

[54] METERING SYSTEM FOR COMPRESSIBLE FLUIDS

[75] Inventors: David P. Owen, Pasadena; Wayne C. Jones, Baltimore; David E. Johnson, Arnold; George V. Nagle, Belcamp, all of Md.

[73] Assignee: The United States of America as represented by the Secretary of the Navy, Washington, D.C.

[21] Appl. No.: 419,473

[22] Filed: Apr. 10, 1995

Related U.S. Application Data

[63] Continuation-in-part of Ser. No. 675,203, Mar. 26, 1991, abandoned.

[51] Int. Cl.$^6$ ...................................................... B67D 5/30
[52] U.S. Cl. .................................. 222/1; 222/21; 222/57; 222/135; 222/145.1
[58] Field of Search ........................................ 141/105, 107; 222/1, 21, 52, 55, 56, 57, 61, 132, 135, 145.1, 145.5

[56] References Cited

U.S. PATENT DOCUMENTS

| | | | |
|---|---|---|---|
| 2,527,136 | 10/1950 | Kagi et al. | 222/57 |
| 2,946,488 | 7/1966 | Kraft | 222/309 |
| 3,015,415 | 1/1967 | Marsh et al. | 222/135 |
| 3,298,383 | 1/1967 | Cooper | 141/105 |
| 3,765,568 | 10/1973 | Leifermann | 222/56 |
| 4,108,335 | 9/1978 | Hoff et al. | 222/137 |
| 4,150,769 | 4/1979 | James | 222/137 |
| 4,167,236 | 9/1979 | Taubenmann | 222/135 |
| 4,279,360 | 7/1981 | Hauser | 222/1 |
| 4,281,777 | 8/1981 | Akens | 222/309 |
| 4,366,918 | 1/1983 | Naka | 222/134 |
| 4,406,163 | 9/1983 | Lofink | 73/274 |
| 4,527,714 | 7/1985 | Bowman | 222/56 |
| 4,745,807 | 5/1988 | O'Neill | 73/434 |
| 4,826,050 | 8/1989 | Murphy et al. | 222/309 |
| 4,852,395 | 8/1989 | Kolpak | 73/61.1 R |
| 4,858,172 | 8/1989 | Stern | 364/160 |
| 4,899,825 | 2/1990 | Bosoni et al. | 169/14 |

OTHER PUBLICATIONS

ASCO (Automatic Switch Co.), 50–56 Hanover Road, Florham Park, New Jersey 07932; excerpt of Catalog No. 31 (3 pages), 1983.
Versa Valves (Versa Products Co.); excerpt of Brochure V 381R (4 pages), 1981.
SOR Inc., P.O. Box 591, 11705 Blackbob Road, Olathe, Kansas 66061; excerpt of Composite Catalog (2 pages) (no date).
Whitey Pneumatic Actuators; excerpt of Catalog W–1062 (2 pages) (no date).

*Primary Examiner*—Andres Kashnikow
*Assistant Examiner*—Kenneth Bomberg
*Attorney, Agent, or Firm*—Howard Kaiser

[57] ABSTRACT

Apparatus and method for accurately and efficiently metering at least one compressible fluid and at least one incompressible fluid for mixing, whereby pressure and therefore density is regulated with regard to each compressible fluid, and volume is regulated with regard to each compressible fluid as well as each incompressible fluid. Compressible fluids in particular are metered more accurately because the mass of each fluid is used as the variable measurement standard, both the density and the volume of each fluid being maintained at controlled and predictable levels. For some embodiments, synchronously interdependent, hydraulically independent regulation of the flow rates of the fluids serves not only to optimize metering accuracy but metering efficiency as well by accounting for relative compressibilities and viscosities between or among the fluids, therby permitting minimization of lag times between or among the flows of the fluids, in this way furthering integration of the individual metering processes of all the fluids into one coordinated system whereby the flows of all the fluids are mutually and/or concurrently controlled.

20 Claims, 1 Drawing Sheet

METERING SYSTEM FOR COMPRESSIBLE FLUIDS

The invention described herein may be manufactured and used by or for the Government of the United States of America for governmental purposes without the payment of any royalties thereon or therefor.

This application is a continuation-in-part of patent application Ser. No. 07/675,203, filed Mar. 26, 1991, now abandoned.

BACKGROUND OF THE INVENTION

The present invention relates to method and apparatus for proportioning fluid mixtures, more particularly method and apparatus for accurately metering two or more fluids for mixing, at least one of which fluid is a compressible fluid.

It is a well-known principle of the physics of compressible fluids that the density of a compressible fluid varies in accordance with its pressure; hence, since the density of a fluid is its mass per unit volume [i.e., (density)=(mass)/(volume)], the mass of a given volume of a compressible fluid will vary accordingly as the pressure varies, and the volume of a compressible fluid of a given mass will vary accordingly as the pressure varies.

This phenomenon gives rise to a problem one encounters when metering compressible fluids. A volumetric quantity meter which disregards changes in pressure and resultant changes in density (and therefore mass per unit volume) of a compressible fluid will often function less accurately than required. In order to accurately meter selected amounts of a compressible fluid, its pressure must be accounted for so as to maintain the compressible fluid at desired density (and therefore mass per unit volume) levels during the metering process. A strictly volume-dependent approach to compressible fluid metering fails to take changes in pressure and therefore associated changes in density into account, and the pressure-resultant variances will yield inaccurate results.

Many applications of quantity metering involve the metering of two or more fluids, at least one of which is a compressible fluid, for the purposes of mixing the fluids in desired proportions. In such applications it advances accuracy to allow for this change in character in terms of density due to change in pressure for each compressible fluid. In this regard it is further beneficial to recognize individual differences in terms of varying degrees of compressibility between or among the fluids. An appurtenant consideration is the effect of differences in compressibility as well as differences in viscosity between or among the fluids on the accuracy and overall efficiency of the metering system, particularly in terms of temporal coordination of system components. At the same time it is desirable to integrate the system components into an efficient whole metering system.

An embodiment of the present invention was developed by the U.S. Navy in order to process and accurately meter a two-component filled polyurethane. This particular embodiment of the present invention was primarily designed by the U.S. Navy for processing urethanes with fillers, one of the components being compressible and therefore affected by change of pressure.

The equipment which had been previously used by the U.S. Navy had been developed for metering and mixing unfilled urethane systems, and could not address the pressure sensitivity of a filled compressible fluid; hence, the previously used apparatus proved to be inaccurate for the desired applications due to fluctuation in component ratios.

An additional consideration in the U.S. Navy's decision to replace the previously used apparatus was the inability of the previously used apparatus to develop the requisite pressures for moving highly filled viscous fluids.

SUMMARY OF THE INVENTION

In view of the foregoing, it is an object of the present invention to provide apparatus and method for accurately and efficiently metering compressible fluid.

It is a further object of the present invention to provide apparatus and method for accurately and efficiently metering at least two fluids for the purposes of mixing the fluids, at least one of the fluids being a compressible fluid.

Another object of this invention is to provide apparatus and method for accurately and efficiently metering at least two fluids of varying degrees of compressibility.

A further object is to provide apparatus and method for accurately and efficiently metering at least two fluids of varying degrees of viscosity.

The aforesaid U.S. Navy-developed embodiment of the present invention provides urethane metering equipment which, although specifically developed for use with polyurethane, admits of applicability to a multitude of resin systems. Indeed, the present invention contemplates various embodiments thereof for application to any number of fluids, liquid or gaseous, of any and all kinds.

The present invention provides apparatus for metering a fluid, comprising a container for the fluid, an inlet conduit for conducting the fluid from a source of the fluid to the container, an outlet conduit for conducting the fluid from the container to a receptacle for the fluid, means for determining the pressure of the fluid in the container, means for determining the volume of the fluid in the container, means for controlling the conducting of the fluid from the source to the container whereby the fluid ceases to be conducted from the source to the container when the pressure of the fluid in the container equals a first selected pressure and when the volume of the fluid in the container equals a first selected volume, and means for controlling the conducting of the fluid from the container to the receptacle whereby the fluid ceases to be conducted from the container to the receptacle when the pressure of the fluid in the container equals a second selected pressure and when the volume of the fluid in the container equals a second selected volume.

The present invention also provides apparatus for metering at least two fluids, at least one fluid being a compressible fluid and at least one fluid being an incompressible fluid, comprising at least two containers, each container corresponding to one fluid, at least two inlet conduits, each inlet conduit being for conducting one fluid from its corresponding source to its corresponding container, at least two outlet conduits, each outlet conduit being for conducting one fluid from its corresponding container to its corresponding receptacle, means for determining the pressure in its corresponding container of each fluid which is a compressible fluid, means for determining the volume in its corresponding container of each fluid, inlet means for controlling the conducting of each fluid from its corresponding source to its corresponding container whereby each fluid which is a compressible fluid ceases to be conducted from its corresponding source to its corresponding container when the pressure of the fluid in its corresponding container equals a first corresponding selected pressure and when the volume of the fluid in its corresponding container equals a first corresponding selected volume, and whereby each fluid which is an incompressible fluid ceases to be conducted from its corresponding source to its corresponding container when the volume of fluid in its corresponding container equals a first corresponding selected volume, and outlet means for controlling the conducting of each fluid from its corresponding container to its corresponding receptacle whereby each fluid which is a compressible fluid ceases to be conducted from its corresponding container to its corresponding receptacle when the pressure of the fluid in its corresponding container equals a second corresponding selected pressure and when the volume of the fluid in its corresponding container equals a second corresponding selected volume, and whereby each fluid which is an incompressible fluid ceases to be conducted from its corresponding container to its corresponding receptacle when the volume of the fluid in its corresponding container equals a second corresponding selected volume.

In addition to providing apparatus for metering any number of fluids, the present invention provides method for metering any number of fluids.

The present invention provides method for metering fluid, comprising causing said fluid to be conducted from a source of the fluid to a container, determining the pressure of the fluid in the container, determining the volume of the fluid in the container, establishing a first pressure setting, establishing a first volume setting, causing the fluid to cease to be conducted from the source of the fluid to the container when the pressure of the fluid in the container equals the first pressure setting and when the volume of the fluid in the container equals the first volume setting, causing the fluid to be conducted from the container to a receptacle, establishing a second pressure setting, establishing a second volume setting, causing the fluid to cease to be conducted from the container to the receptacle when the pressure of the fluid in the container equals the second pressure setting and when the volume of the fluid in the container equals the second volume setting.

The present invention also provides method for metering at least two fluids, at least one said fluid being a compressible fluid and at least one said fluid being an incompressible fluid, comprising causing each fluid to be conducted from a source corresponding to the fluid to a container corresponding to the fluid, determining the pressure of each fluid in its corresponding container, determining the volume of each fluid in its corresponding container, for each fluid which is a compressible fluid establishing a first pressure setting corresponding to the fluid in its corresponding container, for each fluid establishing a first volume setting corresponding to the fluid in its corresponding container, causing each fluid which is a compressible fluid to cease to be conducted from its corresponding source to its corresponding container when the pressure of the fluid in its corresponding container equals its corresponding first pressure setting and when the volume of the fluid in its corresponding container equals its corresponding first volume setting, causing each fluid which is an incompressible fluid to cease to be conducted from its corresponding source to its corresponding container when the volume of the fluid in its corresponding container equals its corresponding first volume setting, causing each fluid to be conducted from its corresponding container to a receptacle, for each fluid which is a compressible fluid establishing a second pressure setting corresponding to the fluid in its corresponding container, for each fluid establishing a second volume setting corresponding to the fluid in its corresponding container, causing each fluid which is a compressible fluid to cease to be conducted from its corresponding container to its corresponding receptacle when the pressure of the fluid in its corresponding container equals its corresponding second pressure setting and when the volume of the fluid in its corresponding container equals its corresponding second volume setting, and causing each fluid which is an incompressible fluid to cease to be conducted from its corresponding container to its corresponding receptacle when the volume of the fluid in its corresponding container equals its corresponding second volume setting.

The present invention was specifically developed and especially designed for metering compressible fluids. Two major features of the present invention represent improvements over conventional metering technology. Firstly, pressure and therefore density is regulated with regard to at least one compressible fluid. Secondly, volume is regulated with regard to each and every fluid, compressible or incompressible.

In the context of the aforenoted embodiment developed by the U.S. Navy, wherein two fluids are metered for mixing, one compressible fluid and one incompressible fluid, both a high pass pressure switch and a low pass pressure switch are included in line with the compressible fluid cylinder; consequently, the density of the compressible fluid is maintained at fixed levels. Of course, pressure regulation of the incompressible fluid is unnecesary for maintaining fixed levels of its density, which is unaffected, or at least unaffected for practical purposes, by change of pressure.

The main advantage of the present invention is that, in accordance therewith, mass is the truly determinative value for measuring the amount of matter being metered. By maintaining both the density and the volume of each fluid at controlled and predictable levels, and using mass as the variable measurement standard, each fluid can be metered with great accuracy.

Just as accuracy is optimized for a weighing-type quantity meter by regulating both density and mass and using volume as the standard, accuracy is optimized for a volumetric-type quantity meter by regulating both density and volume and using mass as the standard. Thus, in accordance with the present invention, it is the quantity of a fluid in terms of its mass which is ultimately sought to be measured for metering purposes. In this regard the density of a fluid is taken into account, with the pressure of a compressible fluid being taken into account as bearing on the density. Moreover, since the mass of a compressible fluid increases in proportion to increase in its volume, its volume is also factored into the process.

It is thus seen that the amount of a fluid in terms of its mass is dependent on both its density and volume, and that accuracy optimization of metering equipment for fluids can be achieved through regulation of both density and volume. It is also seen as a corollary thereof that, by virtue of the interdependence between density and pressure, the amount of a compressible fluid in terms of its mass is dependent on both its pressure and volume, and that accuracy optimization of metering equipment for compressible fluids can be achieved through regulation of both pressure and volume.

The term "volume," as used herein, means volume as is conventionally understood, i.e., the space occupied by a body in three dimensions, e.g., as measured in cubic units. However, it is emphasized that, in accordance with the present invention, determination of a particular volume of fluid, or control (regulation) of a particular volume of fluid, may be indirectly effectuated by means of direct determination or control (regulation), respectively, of some "volumetric functional value," i e. a value which is a function of that particular volume of fluid. Hence, depending on the embodiment of the present invention, the term "volumetric functional value" can refer to, e.g.: "volume"; or, "flow rate" (also called "volumetric flow," "volume flow," "volumetric flow rate" or "volume flow rate"), i.e., the rate of flow of the fluid, for example as conveyed via a conduit such as a pipe or channel [i.e., (flow rate)=(volume)/(unit time)]; or, "flow acceleration," i.e. the acceleration of flow of the fluid, alternatively described as the rate of change of the flow rate.

Many applications of quantity metering apparatus involve the metering of two or more fluids for the purposes of mixing the fluids in desired proportions. For such applications preferred embodiments of the present invention feature a twofold regulatory approach, viz., regulation of the volume of each fluid, along with regulation of the pressure of each fluid which is a compressible fluid. In this manner the metering of each fluid entails greater individualization and hence greater accuracy because not just the volume but also the pressure of each fluid which is a compressible fluid is taken into account.

In practicing many embodiments of the present invention, appropriate pressure settings are selected in order to obtain appropriate densities for the fluids. For many embodiments, moreover, appropriate volume settings are selected in order to facilitate flow coordination between or among the fluids.

For some embodiments of this invention, such as the aforediscussed embodiment developed by the U.S. Navy, the hydraulic cylinders are separately operable so as to enable independent control of the flow rates of the individual fluids. In this way, flow lags between or among fluids of varying compressibilities and/or viscosities which are being metered at the same time can advantageously be minimized or eliminated. This admits of integration of the metering processes of all the fluids into one cooperative system, whereby the flows of all the fluids are mutually and/or concurrently controlled.

It is additionally noted that independent control of the flow rates of the individual fluids may permit greater flexibility in terms of moving fluids of varying viscosities, including particularly viscous fluids. In the aforenoted embodiment developed by the U.S. Navy, for example, independent control of flow rates permitted movement of highly filled viscous fluids for which the previously used equipment failed to develop the requisite pressures.

Other objects, advantages and features of this invention will become apparent from the following detailed description of the invention when considered with the accompanying drawings.

BRIEF DESCRIPTION OF THE DRAWINGS

In order that the present invention may be clearly understood, it will now be described, by way of example, with reference to the accompanying drawings, wherein like numbers indicate the/same or similar components, and wherein.

DETAILED DESCRIPTION OF THE INVENTION

Figure 1:
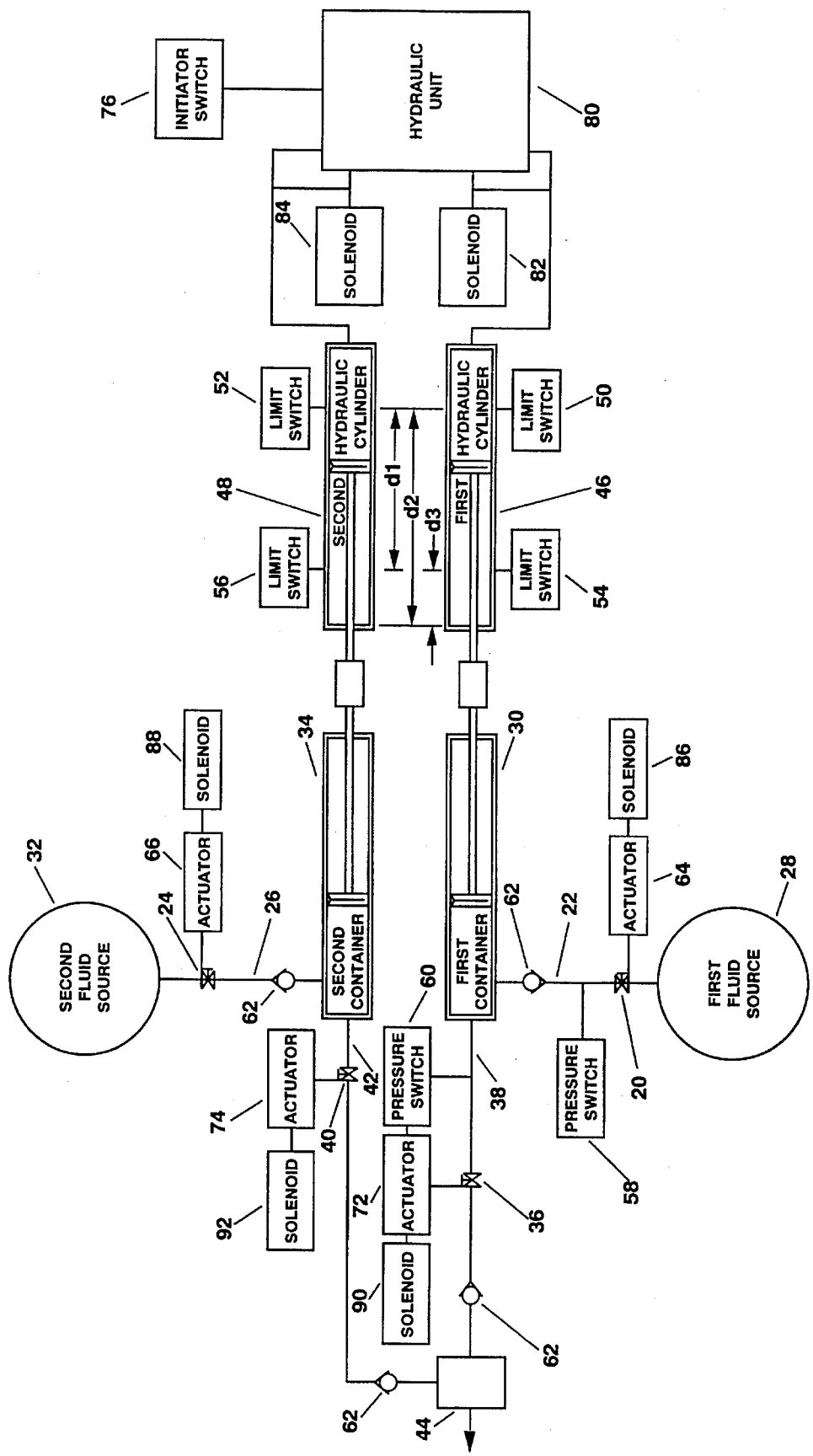
FIG. 1 is a diagrammatic view of an embodiment of the metering apparatus provided by the present invention, wherein two fluids, a compressible fluid and an incompressible fluid, are being metered for mixing.

Referring now to FIG. 1, first inlet valve 20 is located in first inlet conduit 22 and second inlet valve 24 is located in second inlet conduit 26.

First inlet conduit 22 is for conducting a first fluid, in this example a compressible fluid, from first fluid source 28 to first container 30. Second inlet conduit 26 is for conducting a second fluid, in this example an incompressible fluid, from second fluid source 32 to second container 34.

First inlet valve 20 is for valvularly controlling flow of the first fluid from first fluid source 28 to first container 30. Second inlet valve 24 is for valvularly controlling flow of the second fluid from second fluid source 32 to second container 34. First outlet valve 36 is located in first outlet conduit 38 and second outlet valve 40 is located in second outlet conduit 42. First outlet conduit 38 is for conducting the first fluid from first container 30 to receptacle 44. First outlet valve 36 is for valvularly controlling flow of the first fluid from first container 30 to receptacle 44. Second outlet conduit 42 is for conducting the second fluid from second container 34 to receptacle 44. Second outlet valve 40 is for valvularly controlling flow of the second fluid from second container 34 to receptacle 44.

First fluid source 28, second fluid source 32 and receptacle 44 are each any structure for containing fluid, such as, but not limited to, a vat, tank, barrel, tub, vessel or cistern. In many preferred embodiments of the present invention receptacle 44 is a mixing chamber.

Regulation of the flow rate of the first fluid is accomplished by means of retraction and advancement of first hydraulic cylinder 46. Regulation of the flow rate of the second fluid is accomplished by means of retraction and advancement of second hydraulic cylinder 48.

At the beginning of a metering cycle, first hydraulic cylinder 46 and second hydraulic cylinder 48 are each in the retracted position. First hydraulic cylinder 46 is located at first back limit switch 50 and second hydraulic cylinder 48 is located at second back limit switch 52. Actuation of initiator switch 76 (e.g., an automatic switch, a manual switch or a foot switch) initiates the metering process. Inlet valves 20 and 24 are each in the open position and outlet valves 36 and 40 are each in the closed position.

The first fluid is conducted from first fluid source 28 to first container 30 through first inlet conduit 22 and the second fluid is conducted from second fluid source 32 to second container 34 through second inlet conduit 26. Once the pressure in first container 30 reaches the preset pressure for pressure switch 58, inlet valves 20 and 24 are closed and outlet valves 36 and 40 are opened.

Hydraulic cylinders 46 and 48 are then advanced, metering the fluids from containers 30 and 34 into the receptacle 44. The hydraulic cylinders are advanced until they reach the front limit switches. First hydraulic cylinder 46 stops at first front limit switch 54 while second hydraulic cylinder 48 stops at second front limit switch 56.

The pressure in first container 30 is allowed to drop to the preset pressure for pressure switch 60, at which time outlet valves 36 and 40 are closed, inlet valves 20 and 24 are opened, and hydraulic cylinders 46 and 48 are retracted. The hydraulic cylinders are retracted until they reach the back limit switches. First hydraulic cylinder 46 stops at first back limit switch 50 while second hydraulic cylinder 48 stops at second back limit switch 52.

The metering apparatus is now ready to "shoot" again. If initiator switch 76 is an automatic switch, the forward stroke will begin automatically until initiator switch 76 is turned off. If initiator switch 76 is a manual or foot switch, the switch must be actuated once again to complete another metering cycle.

In this example, the flow rate of the first fluid (which is a compressible fluid) and the flow rate of the second fluid (which is an incompressible fluid) are regulated both hydraulically independently of each other and synchronously interdependently with each other. Relative compressibilities and viscosities are accounted for so as to minimize lag times between the respective flows of the first fluid and the second fluid.

Accordingly, in this example the hydraulically independent metering process for the first fluid and the hydraulically independent metering process for the second fluid are advantageously cooperative. For both inlet conduction and outlet conduction of the first fluid and the second fluid, each fluid ceases to be conducted when the pressure of the first fluid equals, in its corresponding said container, a first corresponding selected pressure and when the volume of each fluid equals, in its corresponding container, a corresponding selected volume. In other words, inlet-wise and outlet-wise, each fluid ceases to be conducted when the conjunction of three conditions obtains, viz., (i) reaching of the volume setting for the first fluid, (ii) reaching of the pressure setting for the first fluid and (iii) reaching of the volume setting for the second fluid.

Still referring to FIG. 1, there are two pairs of volume settings and one pair of pressure settings. The appropriate volumes for the fluids in their respective containers are determined in accordance with the locations of the limit switches (i.e., the volume settings) on the hydraulic cylinders, and in accordance with the pressure settings for two pressure switches on first container 30. Volume $V_1$ is the volume of the first fluid in first container 30 which will be metered out into receptacle 44. Volume $V_2$ is the volume of the second fluid in second container 34 which will be metered out into receptacle 44.

First, the distance between second back limit switch 52 and second front limit switch 56 is measured and designated distance $d_1$. This apparatus embodiment of the present invention is advantageously symmetrical. By virtue of front-and-back symmetry, distance $d_1$ can be used to represent the distance traveled by the piston within second container 34. To set the volume $V_2$ for the second fluid (incompressible), the area $A_2$ of second container 34 is multiplied by distance $d_1$:

$$V_2 = A_2(d_1)$$

The volume $V_1$ for the first fluid is more difficult to set because the material is compressible. First, the percent compression of the first fluid must be measured at each of the respective pressures that the pressure switches will be set. Percent compression $C_{\%1}$ is measured for first pressure setting at switch 58 and percent compression $C_{\%2}$ is measured for second pressure setting at switch 60. Then distance $d_2$ (the distance between first back limit switch 50 and the front of first hydraulic cylinder 46) and distance $d_3$ (the distance between first front limit switch 54 and the front of first hydraulic cylinder 46) are each measured.

Distance $d_2$ and distance $d_3$ can be used to represent the distance traveled by the piston in first container 30 so long as the following condition is met: The distance between the piston end within first container 30 and the front of first container 30 must equal the distance between the piston end in hydraulic cylinder 46 and the front of hydraulic cylinder 46.

The volume $V_1$ is then calculated as the area $A_1$ of first container 30 multiplied by the difference between percent compression $C_{\%1}$ at first pressure switch 58 multiplied by distance $d_2$ and percent compression $C_{\%2}$ at second pressure switch 60 multiplied by distance $d_3$:

$$V_1 = A_1[C_{\%1}(d_2) - C_{\%2}(d_3)]$$

Examples of pressure switches which may be appropriately used as first pressure switch 58 and second pressure switch 60 are available from SOR Inc., P.O. Box 591, 11705 Blackbob Road, Olathe, Kans., 66061; see, e.g., SOR Composite Catalog, which advertises manufacture of "pressure and temperature switches for industry." The ordinarily skilled artisan is well acquainted with pressure switches which may be suitably or preferably implemented in practicing the present invention.

Check valve 62 is used in this example for maintaining unidirectional flow of the second fluid through second outlet conduit 42. For some embodiments of the present invention it is preferable to use at least one check valve for maintaining unidirectional flow of at least one fluid through at least one conduit. In this example one or more other check valves 62 may be used, as well, e.g., a check valve 62 for first inlet conduit 22, a check valve 62 for first outlet conduit 38 and/or a check valve 62 for second inlet conduit 26.

Hydraulic unit 80 in this example has first hydraulic solenoid 82 and second hydraulic solenoid 84. First hydraulic solenoid 82 pertains to the retracting and advancing of first hydraulic cylinder 46. Second hydraulic solenoid 84 pertains to the retracting and advancing of second hydraulic cylinder 48. First hydraulic cylinder 46 and second hydraulic cylinder 48 are retracted and advanced with hydraulic fluid from hydraulic unit 80.

First hydraulic solenoid 82 and second hydraulic solenoid 84 are standard hydraulic solenoid valves, each having three positions, viz., advance, retract, neutral; when the appropriate electrical signal is sent to the hydraulic solenoid valve it goes into neutral position. Examples of solenoid valves which may be appropriately used as hydraulic solenoids 82 and 84 are available from Automatic Switch Company (ASCO), 50–56 Hanover Road, Florham Park, N.J., 07932; see, e.g., ASCO Catalog No. 31, 1983, pages 54 and 63. The ordinarily skilled artisan is well acquainted with hydraulic solenoids which may be suitably or preferably implemented in practicing the present invention.

When first back limit switch 50 is actuated, it sends a signal to first hydraulic solenoid 82, stopping retraction of first hydraulic cylinder 46. When first front limit switch 54 is actuated, it sends a signal to first hydraulic solenoid 82, stopping advancement of first hydraulic cylinder 46. When second back limit switch 52 is actuated, it sends a signal to second hydraulic solenoid 84, stopping retraction of second hydraulic cylinder 48. When second front limit switch 56 is actuated, it sends a signal to second hydraulic solenoid 84, stopping advancement of second hydraulic cylinder 48.

In this example opening and closing of valves 20, 24, 36 and 40 is accomplished by single-acting spring-return pneumatic actuators which actuate with compressed air which is controlled by solenoids. When the pressure switch and back limit switches are actuated, or when the pressure switch and front limit switches are actuated, they send signals to the corresponding solenoids. The solenoids, in turn, cause the corresponding pneumatic actuators to be actuated, which in turn cause the corresponding inlet valves to be closed and the corresponding outlet valves to be opened, or the corresponding inlet valves to be opened and the corresponding outlet valves to be closed.

Reference still being made to FIG. 1, first inlet solenoid 86 and first inlet pneumatic actuator 64 pertain to the opening and closing of first inlet valve 20; second inlet solenoid 88 and second inlet pneumatic actuator 66 pertain to the opening and closing of second inlet valve 24; first outlet solenoid 90 and first outlet pneumatic actuator 72 pertain to the opening and closing of first outlet valve 36; and, second outlet solenoid 92 and second outlet pneumatic actuator 74 pertain to the opening and closing of second outlet valve 40. Pneumatic actuators 64, 66, 72 and 74, respectively, actuate with compressed air which is controlled by solenoids 86, 88, 90 and 92, respectively.

When first pressure switch 58 is actuated, it sends a signal to first inlet solenoid 86, second inlet solenoid 88, first outlet solenoid 90 and second outlet solenoid 92. When first back limit switch 50 is actuated, it sends a signal to first inlet solenoid 86, second inlet solenoid 88, first outlet solenoid 90 and second outlet solenoid 92. When second back limit switch 52 is actuated, it sends a signal to first inlet solenoid 86, second inlet solenoid 88, first outlet solenoid 90 and second outlet solenoid 92.

First inlet solenoid 86, second inlet solenoid 88, first outlet solenoid 90 and second outlet solenoid 92 have thus each received signals from first pressure switch 58, first back limit switch 50 and second back limit switch 52; upon receipt of the signals, first inlet solenoid 86, second inlet solenoid 88, first outlet solenoid 90 and second outlet solenoid 92, respectively, cause first inlet pneumatic actuator 64, second inlet pneumatic actuator 66, first outlet pneumatic actuator 72 and second outlet pneumatic actuator 74, respectively, to be actuated, which in turn cause, respectively, first inlet valve 20 to be closed, second inlet valve 24 to be closed, first outlet valve 36 to be opened and second outlet valve 40 to be opened.

Similarly, when second pressure switch 60 is actuated, it sends a signal to first inlet solenoid 86, second inlet solenoid 88, first outlet solenoid 90 and second outlet solenoid 92. When first front limit switch 54 is actuated, it sends a signal to first inlet solenoid 86, second inlet solenoid 88, first outlet solenoid 90 and second outlet solenoid 92. When second front limit switch 56 is actuated, it sends a signal to first inlet solenoid 86, second inlet solenoid 88, first outlet solenoid 90 and second outlet solenoid 92.

First inlet solenoid 86, second inlet solenoid 88, first outlet solenoid 90 and second outlet solenoid 92 have thus each received signals from second pressure switch 60, first front limit switch 54 and second front limit switch 56; upon receipt of the signals, first inlet solenoid 86, second inlet solenoid 88, first outlet solenoid 90 and second outlet solenoid 92, respectively, cause first inlet pneumatic actuator 64, second inlet pneumatic actuator 66, first outlet pneumatic actuator 72 and second outlet pneumatic actuator 74, respectively, to be actuated, which in turn cause, respectively, first inlet valve 20 to be opened, second inlet valve 24 to be opened, first outlet valve 36 to be closed and second outlet valve 40 to be closed.

For some embodiments of the present invention, opening and closing of the inlet and outlet valves is achieved by means of electronically-controlled actuators, rather than by means of combinations of pneumatic actuators with solenoids. Hence, again with reference to FIG. 1, in practicing some embodiments of this invention pneumatic actuators 64, 66, 72 and 74, respectively, in combination with solenoids 86, 88, 90 and 92, respectively, may be replaced with electronically-controlled actuators, for the purposes of opening and closing first inlet valve 20, second inlet valve 24, first outlet valve 36 and second outlet valve 40, respectively.

Examples of pneumatic actuators which may be appropriately used as pneumatic actuators 64, 66, 72 and 74 in practicing this invention are available from Whitey Pneumatic Actuators; see, e.g., Whitey Catalog W-1062. Examples of solenoids which may be appropriately used as first inlet solenoid 86, second inlet solenoid 88, first outlet solenoid 90 and second outlet solenoid 92 are available from Versa Products Company (Versa Valves); see, e.g., Versa Brochure V 381, 1981. In practicing various embodiments of this invention the ordinarily skilled artisan is well acquainted with pneumatic actuators and solenoids which may be suitably or preferably implemented in combination.

Those of ordinary skill in the art know that electronically-controlled actuators and pneumatic actuator-with-solenoid combinations are two alternative means for opening and closing the inlet and outlet valves, and they are well acquainted with methods and techniques for effectuating each. The present inventors practiced the pneumatic actuator-with-solenoid combination approach because the pneumatic actuators seemed to be more responsive than the electronic actuators which had been tried. This is not to say, however, that electronic actuators other than the ones which had actually been tried would not be more responsive than the pneumatic actuators which were practiced, or that either approach can be necessarily recommended over the other for practicing the present invention.

Any number of compressible fluids and any number of incompressible fluids can be metered in accordance with the present invention. Hence, for some embodiments of the present invention, switch-type mechanism is actuated for opening the inlet valves and retracting the corresponding cylinders, thereby allowing the containers to fill with the respective fluids as the corresponding cylinders are hydraulically retracted. Once the back limit switches are actuated and the pressure of each compressible fluid in the corresponding container reaches or just exceeds the corresponding presure setting in a pressure switch, the inlet valves are closed. This insures that all containers are completely filled, and that each compressible fluid is at a preselected pressure.

Switch-type mechanism is actuated for opening the outlet valves and advancing the corresponding cylinders, thereby allowing the metering of the respective fluids out of the containers. The fluids continue to flow until the front limit switches are actuated and the pressure of each compressible fluid in the corresponding container drops to or just below a separate corresponding presure setting in a pressure switch. The outlet valves are closed, emptying of the fluid contents of the container into the mixing chamber having been assured, and the metering apparatus of the present invention may be recycled.

Many preferred embodiments of the present invention, such as described in the above example, feature independent hydraulics for each of at least two fluids whereby the independent hydraulics are synchronized. Noteworthy for such embodiments is the existence of two conditions which are precedent to the occurrence of each of two functions. The two functions are: (i) the mutual and/or concurrent closing of all the inlet valves; and, (ii) the mutual and/or concurrent closing of all the outlet valves. The two conditions precedent are: (i) realization of the corresponding volume setting for each and every fluid; and, (ii) realization of the corresponding pressure setting for each and every compressible fluid. Hence, there is a conjunctive relationship of predetermined-volume realization for each of all the fluids, together with predetermined-pressure realization for each of all the fluids which are compressible fluids, which constitutes condition precedent to closing of all the inlet valves as well as to closing of all the outlet valves.

A study was conducted by the U.S. Navy with regard to measurement of the compressibility of a compressible fluid to be metered as a function of pressure. Typically, much of the compression of a compressible fluid takes place at relatively low pressures, and the compression asymptotically approaches some ultimate value at very high pressures. It was determined in the study that, for this particular fluid, approximately 80% of the ultimate compression was obtained at 120 psi. Accordingly, the U.S. Navy's metering apparatus, including the pressure limit switches, was then operated in such a manner that the fluid pressure never was allowed below 120 psi. This limited the fluid density fluctuation to approximately 20% of the fluctuation that would take place over the full pressure spectrum, thus reducing fluctuation in the mass of fluid metered due to pressure variations.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. Apparatus for metering a fluid from a source of said fluid to a receptacle for said fluid, said apparatus comprising:
    a container for said fluid;
    an inlet conduit for conducting said fluid from said source to said container;
    an outlet conduit for conducting said fluid from said container to said receptacle;
    means for controlling, selectively with respect to the pressure and the volume of said fluid in said container, said conducting of said fluid from said source to said container and from said container to said receptacle, whereby said fluid ceases to be conducted from said source to said container when the pressure of said fluid in said container equals a first selected pressure and when the volume of said fluid in said container equals a first selected volume, and whereby said fluid ceases to be conducted from said container to said receptacle when the pressure of said fluid in said container equals a second selected pressure and when the volume of said fluid in said container equals a second selected volume.

2. Apparatus as in claim 1, wherein said apparatus is for metering a compressible fluid.

3. Apparatus as in claim 1, wherein said means for controlling said conducting of said fluid includes:
    a hydraulic cylinder;
    a hydraulic solenoid;
    a first pressure switch;
    a second pressure switch;
    a back limit switch;
    a front limit switch;
    an inlet valve;
    an outlet valve;
    an inlet valve-actuating device; and
    an outlet valve-actuating device;
    said hydraulic cylinder being retractable until reaching said back limit switch whereupon said back limit switch signals said hydraulic solenoid thereby stopping said retracting and whereupon said back limit switch signals said inlet valve-actuating device and said outlet valve-actuating device;
    said hydraulic cylinder being advancable until reaching said front limit switch whereupon said front limit switch signals said hydraulic solenoid thereby stopping said advancing and whereupon said front limit switch signals said inlet valve-actuating device and said outlet valve-actuating device;
    said hydraulic cylinder engaging said container whereby the location of said back limit switch with respect to said hydraulic cylinder is related to said first selected volume and whereby the location of said front limit switch with respect to said hydraulic cylinder is related to said second selected volume;
    said first pressure switch signaling said inlet valve-actuating device and said outlet valve-actuating device when said first selected pressure is reached;
    said second pressure switch signaling said inlet valve-actuating device and said outlet valve-actuating device when said second selected pressure is reached;
    said inlet valve-actuating device causing said inlet valve to close and said outlet valve-actuating device causing said outlet valve to open, when said back limit switch signals said inlet valve-actuating device and said outlet valve-actuating device, and when said first pressure switch signals said inlet valve-actuating device and said outlet valve-actuating device;
    said outlet valve-actuating device causing said outlet valve to close and said inlet valve-actuating device causing said inlet valve to open, when said front limit switch signals said inlet valve-actuating device and said outlet valve-actuating device, and when said first pressure switch signals said inlet valve-actuating device and said outlet valve-actuating device.

4. Apparatus as in claim 3, wherein said inlet valve-actuating device and said outlet valve-actuating device each include a pneumatic actuator and a pneumatic solenoid, said pressure switch and said limit switch signaling said pneumatic solenoid, said pneumatic solenoid controlling said pneumatic actuator.

5. Apparatus as in claim 3, wherein said inlet valve-actuating device and said outlet valve-actuating device each include an electronically-controlled actuator.

6. Apparatus as in claim 3, wherein:
    said fluid is a compressible fluid;
    the distance between the piston end within said container and the front of said container equals the distance between the piston end in said hydraulic cylinder and the front of said hydraulic cylinder; and
    the volume V of said compressible fluid in said container which is to be metered out into said receptacle is determined by the formula $V=A$, wherein A is the area of said container, $C_1$ is the percent compression of said compressible fluid in association with said first pressure switch, $C_2$ is the percent compression of said compressible fluid in association with said second pressure switch, $d_b$ is the distance between said back limit switch and the front of said hydraulic cylinder, and $d_f$ is the distance between said front limit switch and the front of said hydraulic cylinder.

7. Apparatus for metering at least two fluids for mixing in a receptacle, each said fluid having one source corresponding to said fluid, at least one said fluid being a compressible fluid and at least one said fluid being an incompressible fluid, said apparatus comprising:
    at least two containers, each said fluid having one said container corresponding to said fluid;
    at least two inlet conduits, each said inlet conduit being for conducting of one said fluid from its corresponding said source to its corresponding said container;
    at least two outlet conduits, each said outlet conduit being for conducting of one said fluid from its corresponding said container to said receptacle;

means for controlling, selectively with respect to the pressure and the volume of each said compressible fluid in its corresponding said container and selectively with respect to the volume of each said incompressible fluid in its corresponding said container, said conducting of each said fluid from its corresponding said source to its corresponding said container and from it corresponding said container to said receptacle, whereby each said compressible fluid ceases to be conducted from its corresponding said source to its corresponding said container when the pressure of said compressible fluid in its corresponding said container equals a first corresponding selected pressure and when the volume of said compressible fluid in its corresponding said container equals a first corresponding selected volume, whereby each said incompressible fluid ceases to be conducted from its corresponding said source to its corresponding said container when the volume of said incompressible fluid in its corresponding said container equals a first corresponding selected volume, whereby each said compressible fluid ceases to be conducted from its corresponding said container to said receptacle when the pressure of said compressible fluid in its corresponding said container equals a second corresponding selected pressure and when the volume of said compressible fluid in its corresponding said container equals a second corresponding selected volume, and whereby each said incompressible fluid ceases to be conducted from its corresponding said container to said receptacle when the volume of said incompressible fluid in its corresponding said container equals a second corresponding selected volume.

8. Apparatus as in claim 7 for mixing in a receptacle which is selected from the group consisting of vat, tank, barrel, tub, vessel, cistern and mixing chamber.

9. Apparatus as in claim 7, wherein said means for controlling said conducting of each said fluid includes at least two independent means, each said independent means being for controlling said conducting of one said fluid.

10. Apparatus as in claim 9, wherein at least two said independent means are inlet-wise synchronized independent means, at least one said inlet-wise synchronized independent means being for controlling said conducting of one said compressible fluid and at least one said inlet-wise synchronized independent means being for controlling said conducting of one said incompressible fluid, whereby each said fluid having its conducting controlled by one said inlet-wise synchronized independent means ceases to be conducted from its corresponding said source to its corresponding said container when the pressure of each said compressible fluid having its conducting controlled by one said inlet-wise synchronized independent means equals, in its corresponding said container, a first corresponding selected pressure and when the volume of each said fluid having its conducting controlled by one said inlet-wise synchronized independent means equals, in its corresponding said container, a first corresponding selected volume.

11. Apparatus as in claim 9, wherein at least two said independent means are synchronized, both inlet-wise and outlet-wise, at least one said synchronized independent means being for controlling said conducting of one said compressible fluid and at least one said synchronized independent means being for controlling said conducting of one said incompressible fluid, whereby:

each said fluid having its conducting controlled by one said synchronized independent means ceases to be conducted from its corresponding said source to its corresponding said container when the pressure of each said compressible fluid having its conducting controlled by one said synchronized independent means equals, in its corresponding said container, a first corresponding selected pressure and when the volume of each said fluid having its conducting controlled by one said synchronized independent means equals, in its corresponding said container, a first corresponding selected volume; and each said fluid having its conducting controlled by one said synchronized independent means ceases to be conducted from its corresponding said container to said receptacle when the pressure of each said compressible fluid having its conducting controlled by one said synchronized independent means equals, in its corresponding said container, a second corresponding selected pressure and when the volume of each said fluid having its conducting controlled by one said synchronized independent means equals, in its corresponding said container, a second corresponding selected volume.

12. Apparatus as in claim 9, wherein at least two said independent means are outlet-wise synchronized independent means, at least one said outlet-wise synchronized independent means being for controlling said conducting of one said compressible fluid and at least one said outlet-wise synchronized independent means being for controlling said conducting of one said incompressible fluid, whereby each said fluid having its conducting controlled by one said outlet-wise synchronized independent means ceases to be conducted from its corresponding said container to said receptacle when the pressure of each said compressible fluid having its conducting controlled by one said outlet-wise synchronized independent means equals, in its corresponding said container, a second corresponding selected pressure and when the volume of each said fluid having its conducting controlled by one said outlet-wise synchronized independent means equals, in its corresponding said container, a second corresponding selected volume.

13. Apparatus as in claim 9, wherein at least one said independent means includes:

a hydraulic cylinder;

a hydraulic solenoid;

a first pressure switch;

a second pressure switch;

a back limit switch;

a front limit switch;

an inlet valve;

an outlet valve;

an inlet valve-actuating device; and an outlet valve-actuating device;

said hydraulic cylinder being retractable until reaching said back limit switch whereupon said back limit switch signals said hydraulic solenoid thereby stopping said retracting and whereupon said back limit switch signals said inlet valve-actuating device and said outlet valve-actuating device;

said hydraulic cylinder being advancable until reaching said front limit switch whereupon said front limit switch signals said hydraulic solenoid thereby stopping said advancing and whereupon said front limit switch signals said inlet valve-actuating device and said outlet valve-actuating device;

said hydraulic cylinder engaging one said container, corresponding to one said fluid, whereby the location of said back limit switch with respect to said hydraulic cylinder is related to said first corresponding selected volume and whereby the location of said front limit switch with respect to said hydraulic cylinder is related to said second corresponding selected volume;

said first pressure switch signaling said inlet valve-actuating device and said outlet valve-actuating device when said first corresponding selected pressure is reached;

said second pressure switch signaling said inlet valve-actuating device and said outlet valve-actuating device when said second corresponding selected pressure is reached;

said inlet valve-actuating device causing said inlet valve to close and said outlet valve-actuating device causing said outlet valve to open, when said back limit switch signals said inlet valve-actuating device and said outlet valve-actuating device, and when said first pressure switch signals said inlet valve-actuating device and said outlet valve-actuating device;

said outlet valve-actuating device causing said outlet valve to close and said inlet valve-actuating device causing said inlet valve to open, when said front limit switch signals said inlet valve-actuating device and said outlet valve-actuating device, and when said first pressure switch signals said inlet valve-actuating device and said outlet valve-actuating device.

14. Apparatus as in claim 13, wherein said inlet valve-actuating device and said outlet valve-actuating device each include a pneumatic actuator and a pneumatic solenoid, said pressure switch and said limit switch signaling said pneumatic solenoid, said pneumatic solenoid controlling said pneumatic actuator.

15. Apparatus as in claim 13, wherein said inlet valve-actuating device and said outlet valve-actuating device each include an electronically-controlled actuator.

16. Apparatus as in claim 13, wherein, for at least one said independent means for controlling said conducting of one said compressible fluid:

the distance between the piston end within the corresponding said container and the front of the corresponding said container equals the distance between the piston end in the corresponding said hydraulic cylinder and the front of the corresponding said hydraulic cylinder; and the volume V of said compressible fluid in the corresponding said container which is to be metered out into said receptacle is determined by the formula V=A, wherein A is the area of the corresponding said container, $C_1$ is the percent compression of said compressible fluid in association with the corresponding said first pressure switch, $C_2$ is the percent compression of said compressible fluid in association with the corresponding said second pressure switch, $d_b$ is the distance between said back limit switch and the front of the corresponding said hydraulic cylinder, and $d_f$ is the distance between said front limit switch and the front of the corresponding said hydraulic cylinder.

17. Method for metering fluid from a source of said fluid to a receptacle for said fluid, said method comprising:

providing a container for said fluid; and controlling, selectively with respect to the pressure and the volume of said fluid in said container, said conducting of said fluid from said source to said container and from said container to said receptacle, said controlling including:

establishing a first pressure setting;

establishing a first volume setting;

causing said fluid to cease to be conducted from said source of said fluid to said container when the pressure of said fluid in said container equals said first pressure setting and when the volume of said fluid in said container equals said first volume setting;

establishing a second pressure setting;

establishing a second volume setting;

causing said fluid to cease to be conducted from said container to said receptacle when the pressure of said fluid in said container equals said second pressure setting and when the volume of said fluid in said container equals said second volume setting.

18. Method as in claim 17, wherein said method is for metering a compressible fluid.

19. Method for metering at least two fluids for mixing in a receptacle, each said fluid having one source corresponding to said fluid, at least one said fluid being a compressible fluid and at least one said fluid being an incompressible fluid, said method comprising:

providing for each said fluid one container corresponding to said fluid; and controlling, selectively with respect to the pressure and the volume of each said compressible fluid in its corresponding said container and selectively with respect to the volume of each said incompressible fluid in its corresponding said container, said conducting of each said fluid from its corresponding said source to its corresponding said container and from it corresponding said container to said receptacle, said controlling including:

for each said fluid which is a compressible fluid, establishing a first pressure setting corresponding to said fluid in its corresponding said container;

for each said fluid, establishing a first volume setting corresponding to said fluid in its corresponding said container;

causing each said fluid which is a compressible fluid to cease to be conducted from its corresponding said source to its corresponding said container when the pressure of said fluid in its corresponding said container equals its corresponding said first pressure setting and when the volume of said fluid in its corresponding said container equals its corresponding said first volume setting;

causing each said fluid which is an incompressible fluid to cease to be conducted from its corresponding said source to its corresponding said container when the volume of said fluid in its corresponding said container equals its corresponding said first volume setting;

for each said fluid which is a compressible fluid, establishing a second pressure setting corresponding to said fluid in its corresponding said container;

for each said fluid, establishing a second volume setting corresponding to said fluid in its corresponding said container;

causing each said fluid which is a compressible fluid to cease to be conducted from its corresponding said container to said receptacle when the pressure of said fluid in its corresponding said container equals its corresponding said second pressure setting and when the volume of said fluid in its corresponding said container equals its corresponding said second volume setting; and causing each said fluid which is an incompressible fluid to cease to be conducted from its corresponding said container to said receptacle when the volume of said fluid in its corresponding said container equals its corresponding said second volume setting.

20. Method as in claim 17, wherein said controlling said conducting of said fluid includes:

implementing a back limit switch, a front limit switch and a hydraulic cylinder;

said hydraulic cylinder engaging said container whereby the distance between the piston end within said container and the front of said container equals the distance between the piston end in said hydraulic cylinder and the front of said hydraulic cylinder;

said establishing a first volume setting including locating said back limit switch with respect to said hydraulic cylinder;

said establishing a second volume setting including locating said front limit switch with respect to said hydraulic cylinder; and determining the volume V of said compressible fluid in said container which is to be metered out into said receptacle by the formula V=A, wherein A is the area of said container, $C_1$ is the percent compression of said compressible fluid in association with said first pressure setting, $C_2$ is the percent compression of said compressible fluid in association with said second pressure setting, $d_b$ is the distance between said back limit switch and the front of said hydraulic cylinder, and $d_f$ is the distance between said front limit switch and the front of said hydraulic cylinder.

* * * * *